Sept. 20, 1960   R. C. LANGFORD ET AL   2,953,148
PNEUMATIC SYSTEM WITH FEEDBACK ARRANGEMENT
Filed March 8, 1955
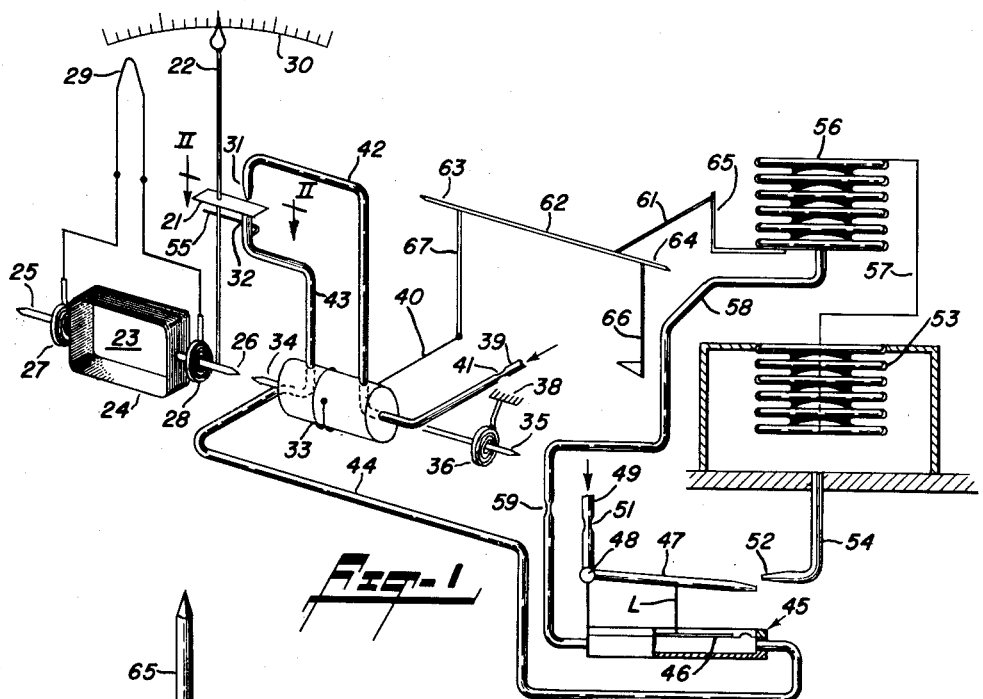
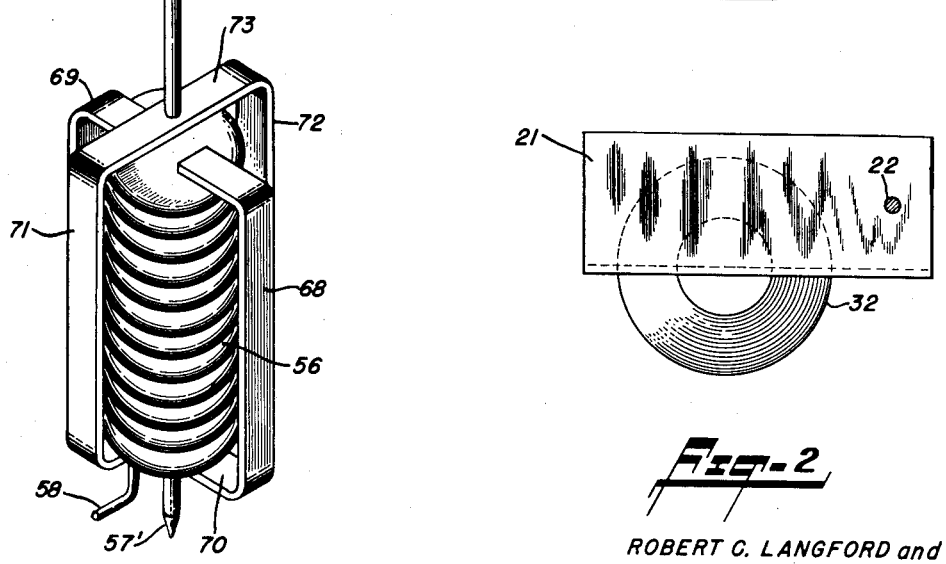
ROBERT C. LANGFORD and
STANLEY M. VAN PELT
INVENTOR.
BY
*Rudolph G. Funick*
ATTORNEY United States Patent Office 2,953,148
Patented Sept. 20, 1960

2,953,148

PNEUMATIC SYSTEM WITH FEEDBACK ARRANGEMENT

Robert C. Langford, Elizabeth, and Stanley M. Van Pelt, Nixon, N.J., assignors, by mesne assignments, to Daystrom, Incorporated, Murray Hill, N.J., a corporation of New Jersey Filed Mar. 8, 1955, Ser. No. 492,823

10 Claims. (Cl. 137—84)

This invention relates to pneumatic systems of the closed loop class wherein changes in a variable condition cause corresponding variations in air pressure to effectuate the operation of indicating, recording and/or control means and more particularly to a novel pneumatic feedback arrangement for use in such systems to prevent hunting thereof.

A closed loop system is one wherein changes in an input signal result in a corresponding change in the system output and a portion of the output is fed back to the input, in proper phase, to effect system stability and/or sensitivity.

Our novel feedback arrangement is adopted for use in a closed loop pneumatic system, but the following description will be restricted to such arrangement forming part of a pneumatic follow-up system. Such system comprises a device sensitive to changes in a variable condition as, for example, an electrical instrument having a pointer cooperating with a scale and actuated by electrical energy, a pivoted beam unbalanced by changes in weight or humidity, etc. The movement of such condition-sensing device alters the position of a vane in a low-pressure air stream between axially-aligned nozzles. The variation of the air pressure in the receiving nozzle actuates an air relay which, in turn, produces a corresponding pressure variation in a higher air pressure system. Such variation in the air pressure output of the relay is utilized to actuate suitable mechanism to provide a measurement and/or record of the instantaneous state of the condition or to effect a control of the condition at a selected point. The system is self-balancing in that any change in the variable condition results in a corresponding, counter-balancing change in the air-operated mechanism.

In general, any closed loop system may be subject to cycling or hunting at the balance point due to the relative time lag between a change in the input signal and the effective action of the feedback factor upon the input signal.

An object of this invention is the provision of a simple, effective arrangement for preventing hunting in a pneumatic system of the type including air-operated balancing means.

An object of this invention is the provision of a pneumatic system responsive to changes in a variable condition and including a primary bellows actuated by variations in the output air pressure of an air relay, an auxiliary bellows mechanically coupled to the primary bellows said auxiliary bellows being arranged to develop an air pressure change opposed to that resulting in actuation of the primary bellows.

An object of this invention is the provision of a pneumatic system responsive to changes in a variable condition and comprising an air relay actuated upon changes in the condition to produce a corresponding pressure variation in an air line, a primary bellows movable in response to the pressure variations in the air line, an auxiliary bellows mechanically coupled to the primary bellows, and an air line connected between the auxiliary bellows and the air relay, said auxiliary bellows being arranged to develop air pressure variations opposed to those which actuate the air relay.

An object of this invention is the provision of a pneumatic system responsive to changes in a variable condition and comprising a sensing member movable in accordance with changes in the condition, axially-aligned discharge and receiving nozzles, means normally maintaining an air stream between the nozzles, a vane actuated by the sensing member to inhibit more or less the quantity of air passing to the receiving nozzle, an air relay having an actuating chamber connected to the receiving nozzle, a primary bellows controlled by the air relay, an auxiliary bellows coupled to the primary bellows, and a tube connecting the auxiliary bellows to the said actuating chamber, said auxiliary bellows being arranged to provide a negative feedback signal to the air relay upon movement of the primary bellows.

An object of this invention is the provision of an electro-pneumatic follow-up system comprising a vane movable by the pointer of an electrical instrument between axially-aligned air nozzles, coupling means carrying the air nozzles and rotatable co-axially with the pointer, air-operated means to cause the coupling means to rotate so that the nozzles carried thereby follow movement of the vane and pneumatic means preventing hunting of the coupling means.

These and other objects and advantages will become apparent from the following description of the invention when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

Figure 1 is a diagrammatic view of the electric and pneumatic circuits in an instrument embodying our invention;

Figure 2 is a fragmentary sectional view on the line II—II of Figure 1, in the direction of the arrows; and Figure 3 is a detailed view, in perspective, of the auxiliary bellows for developing a negative-phase feedback signal to prevent hunting of the system.

In the instrument illustrated in Figure 1, which includes a self-balancing system involving mechanism for sensing changes in a variable condition, there is a vane 21 carried by a lever 22 (which, in this instance, is the pointer of a sensitive electrical instrument, such as a millivoltmeter, generally designated 23) and movable over a suitable scale 30. Only the coil 24 of this instrument, rotatably mounted on pivots 25 and 26, and its pointer 22 are illustrated. The coil 24 is mounted between the poles of a permanent magnet, not shown. Each of the pivots 25 and 26 has a spiral hair spring, 27 and 28, secured thereto in conventional manner and the coil 24 is held in a given or zero position by these springs until electrical current is passed therethrough. Such current may, for example, be generated by a thermocouple 29, serving as temperature-measuring device in a furnace, not shown.

The follow-up mechanism comprises a pair of axially-aligned nozzles; namely, a supply or discharge nozzle 31 and a receiving nozzle 32. These nozzles form a pneumatic couple and are mounted for rotation coaxially with respect to the coil 24. The nozzles are carried by a coupling 33 mounted for rotation on pivots 34 and 35 and biased in a given direction by resilient means such as a spiral hair spring 36, one end of which is connected with the pivot 35 and the other end to a fixed abutment as indicated at 38. A wire 40 has one end entwined around and fastened to the coupling 33 and the other end fastened to a rigid arm 67.

The construction of the coupling 33, so as to afford a transfer of air from the discharge nozzle to the receiving nozzle while permitting free rotation of the coupling, is described in a co-pending United States application, Serial No. 482,930, filed March 8, 1955, now Patent No. 2,838,028, in the name of Paul F. K. Erbguth and entitled Pneumatic Follow-Up System. Suffice to say here that air under pressure is supplied to the discharge nozzle 31 from a suitable source through the tube 39, having a flow restrictor 41 therein, and the tube 42. There is, therefore, a stream of air flowing from the discharge nozzle to the receiving nozzle 32 except as inhibited by the vane 21. The receiving nozzle is connected to the actuating chamber of an air relay 45 by the tubes 43 and 44, such chamber being closed by a diaphragm 46. It will be apparent, then, that the diaphragm will move in response to changes in the air pressure within the tube 44 as determined by the quantity of air passing to the receiving nozzle 32.

The air relay may be of conventional construction and is here shown as comprising a nozzle tube 47 pivoted at 48 and connected to the relay diaphragm 46 by a link L. Air under pressure is supplied to the nozzle 47 through the tube 49 having a restrictor 51 therein. It may here be pointed out that the air supplied to the relay nozzle 47 has a pressure in the range of pounds per square inch to effect a positive operation of a suitable rebalancing mechanism, as will be described in detail hereinbelow. On the other hand, the pressure of the air supplied to the rotatable nozzle 31 is very low, of the order of not more than 3 inches of water, thereby reducing to a minimum any reaction between the air stream and the vane carried by the low torque sensing device.

Cooperating with the pivoted air nozzle 47 of the air relay is a fixed receiving nozzle 52, communicating with a relatively large or main follow-up bellows 53 through tube 54. The bellows 53 is desirably of the type formed of bronze or other suitable non-rusting resilient material, and the bottom thereof is connected to the top of a smaller auxiliary or "feedback" bellows 56, similarly constructed, as by means of a rigid connecting rod 57. The interior of the "feedback" bellows 56 is connected to the chamber of the air relay 45 by means of a tube 58 containing a restriction 59.

The bottom of the "feedback" bellows 56 is connected to a crank 61 extending from a shaft 62, pivoted in bearings at 63 and 64, as by means of a connecting rod 65. The shaft 62 may also carry a pen arm 66, which may record on a chart moving at a uniform speed the rotation of the shaft. The shaft 62 also carries the crank 67, connected to the coupling 33 by means of the wire 40, for operating the same against the bias of the spring 36.

The operation of the system will now be described. It will be assumed the system is in balance under which condition the leading edge of the vane 21 is disposed substantially in the center of the air stream as shown in Figure 2. Upon a downscale movement of the pointer 22, that is, counter-clockwise, the vane will be moved further out of the air stream whereupon the air pressure in the tubes 43, 44 and the air relay chamber is increased. Such increase in air pressure results in an upward deflection of the air relay diaphragm 46 thereby moving the nozzle 47 further into alignment with the associated, fixed nozzle 52. This results in an increase in the air pressure within the chamber surrounding the primary bellows 53 causing an upward movement of the bellows. It must here be pointed out that the auxiliary bellows 56 is supported solely by the primary bellows by the connecting rod 57 and that the tube 58 is of a flexible character so as not to impede movement of the auxiliary bellows. Thus, the upward deflection of the primary bellows produces a corresponding upward movement of the top of the auxiliary bellows. Inasmuch as the auxiliary bellows are mechanically linked to the shaft 62 by the crank 65 and arm 61, there results a positive, corresponding counterclockwise rotation of the shaft against the bias of the spring 36. Rotation of the arm 67 pulls the wire 40 thereby rotating the coupling 33 in a counter-clockwise direction until the vane 21 substantially is in its initial, or throttling, position within the air stream, that is, until a new balance obtains.

An upscale movement of the pointer 22 results in a reverse operation whereby the arm 67 and the wire 40 bring about a clockwise rotation of the aligned nozzles to follow the pointer deflection. In order to prevent movement of the vane 21 beyond the air stream upon an upscale deflection of the pointer a suitable stop 55 is secured to the nozzle 32.

Referring now specifically to the primary and auxiliary bellows it will be noted that the connecting rod 57 is attached to the lower end of the primary bellows 53 and to the upper end of the auxiliary bellows 56. In other words, the auxiliary bellows are, effectively, suspended by the primary bellows. Consequently, a collapse of the bellows 53 (upward movement) results in an initial, slight expansion of the bellows 56, due to its inertia, whereas an expansion of the bellows 53 (downward movement) results in an initial collapse of the bellows 56. Such initial expansion and collapse of the auxiliary bellows changes the air pressure in the air relay chamber, such pressure change having a sense opposite to that brought about by the variation in air pressure in the tube 44, and the magnitude of such pressure change depending upon the velocity as well as the extent of movement of the primary bellows. More specifically, if it is assumed that the vane 21 is moved further out of the air stream an increased air pressure is developed in the relay chamber, resulting in an upward movement of the primary bellows 53. Such upward movement produces a slight, initial expansion of the "floating" auxiliary bellows 56 and the increase in the internal volume of the auxiliary bellows results in a corresponding decrease of pressure within the relay chamber. It will be apparent, therefore, that the auxiliary bellows provides a feedback signal, or effect, upon initial system unbalance. Such feedback prevents hunting of the system at the balance point.

Reference is now made to Figure 3 which is a perspective view showing the construction of the auxiliary bellows 56 and its attachments. The connecting rod (shown diagrammatically and identified by the numeral 57 in Figure 1) is here shown as a U-shaped metal bracket having side arms 68, 69 spaced from the side of the closed bellows and a base 70 spaced from the bottom of the bellows. The upper ends of the side arms 68, 69 are bent inwardly and secured to the upper surface of the bellows, as by solder. A pointed shaft 57' is rigidly secured to the bracket base 70. A similar U-shaped metal bracket is reversely disposed to the first bracket and has the side arms 71, 72 spaced from the side of the bellows and a base 73 spaced from the top of the bellows. Such second bracket also has the ends of the side arms bent inwardly but soldered to the bottom of the bellows. A pointed shaft 65 is secured to the bracket base 73 and aligned with the opposed shaft 57'.

In the system, the lower shaft 57', of the auxiliary bellows, rests in a suitable bearing not shown but carried by the bottom of the primary bellows, and the upper shaft is similarly retained in a suitable bearing carried by the mechanism for providing a follow-up action of the system as, for example, the arm 61 (Figure 1) attached to the shaft 62. The auxiliary bellows, therefore, may be considered as mechanically coupled between the primary bellows and the follow-up mechanism but in a floating manner. In view of the restraining influence exerted upon the upper shaft 65 by the follow-up mechanism, it will be apparent that a sudden, upward movement of the lower shaft 57' will result in an initial, slight expansion of the auxiliary bellows, thereby decreasing the air pressure within the bellows, the connecting tube 58 and the chamber of the air relay, as has already been described.

From the foregoing disclosure, it will be seen that we have provided pneumatic apparatus which is not only responsive to changes in a variable condition, but which pneumatically is maintained in balance. In the present instance the return to the balanced condition is a return substantially to the initial flow of air between the cooperating nozzles. In the present instance there is also a negative feedback between an auxiliary bellows and the air relay, which feedback prevents oscillations developing during the operation of the device.

Having now described our invention in detail, in accordance with the requirements of the patent statutes, various changes and modifications will suggest themselves to those skilled in the art, and it is intended that such changes and modifications shall fall within the scope and spirit of the invention, as recited in the following claims.

We claim:

1. A pneumatic system comprising a member movable in response to changes in a variable condition and producing corresponding air pressure variations in an air line, an air relay directly responsive to the said air pressure variations, said relay producing corresponding air pressure variations in another air line, a primary bellows movable in response to the air pressure variations in the said other air line and an auxiliary bellows mechanically coupled to the primary bellows and pneumatically connected to the air relay, said auxiliary bellows by its inertia being effective upon movement of the primary bellows to change the air pressure in the air relay in a sense opposite to that caused by the air pressure variations in the said first air line.

2. A pneumatic system comprising a vane movable between a set of axially-aligned nozzles, means maintaining a flow of air from one nozzle to the other except as cut off by the vane, a primary bellows movable in direct response to variations in the air pressure in the said other nozzle, an auxiliary bellows mechanically coupled to the primary bellows, and means permitting air flow between the auxiliary bellows and the said other nozzle, said auxiliary bellows by its inertia developing a change in air pressure upon movement of the primary bellows that is opposite to that effecting movement of the primary bellows.

3. A pneumatic system comprising a vane movable between a pair of axially-aligned nozzles, means maintaining a flow of air between the nozzles except as cut off by the vane, an air relay responsive to the air pressure variations in one of the nozzles and correspondingly varying the air pressure in an air line, a primary bellows movable in response to the variation of pressure in the said air line, an auxiliary bellows mechanically coupled to the primary bellows and connected to the air relay, said auxiliary bellows by its inertia being effective upon movement of the primary bellows to change the air pressure in the air relay in a sense opposite to that caused by a change in air pressure in the said one nozzle.

4. In a self-balancing pneumatic system of the type comprising an air stream flowing between a discharge nozzle and an axially-aligned receiving nozzle, a vane movable in the air stream, an air relay connected to the receiving nozzle and having a diaphragm movable in accordance with air pressure variations in said nozzle, means actuated by the diaphragm and correspondingly varying the air pressure in an air line, and mechanism responsive to the air pressure variations in the air line to maintain the vane at a predetermined position in the air stream; the improvement comprising a primary bellows actuated by the air pressure variations in the air line, an auxiliary bellows mechanically coupled to the primary bellows, means coupling the auxiliary bellows to the said mechanism, and a tube connecting the auxiliary bellows to the air relay, said auxiliary bellows by its inertia being effective on movement of the primary bellows to change the air pressure acting on the relay diaphragm in a sense opposite to the air pressure variation in the said receiving nozzle.

5. A pneumatic follow-up system comprising a rotatable member carrying a vane, a pair of axially-aligned nozzles disposed on opposite sides of the vane, means connecting one nozzle to a source of air under pressure resulting in a stream of air flowing from the one nozzle to the other nozzle except as cut off by the vane, coupling means carrying the aligned nozzles and rotatable about an axis coinciding with that of the said rotatable member, an air relay having a chamber closed by a diaphragm and connected to the said other nozzle, means actuated by movement of the diaphragm to correspondingly vary the pressure of air in an air line, a primary bellows movable by variations of the pressure in the air line, an auxiliary bellows mechanically coupled to the primary bellows, and movable therewith, mechanism coupled to the auxiliary bellows and rotating the said coupling means in a direction to maintain the said vane substantially in its throttling position in the air stream, and a tube connecting the auxiliary bellows to the relay chamber, movement of the primary bellows causing the auxiliary bellows to vary the pressure of the air in the relay chamber in a direction opposite to that brought about by movement of the vane in the air stream.

6. An arrangement for preventing hunting in a pneumatic system of the type comprising a discharge nozzle and an axially-aligned receiving nozzle, an air stream flowing between the nozzles except as inhibited by a vane movable in the air stream, and means responsive to variations in the air pressure in the receiving nozzle and effecting a return of the vane to a throttling position in the air stream, said arrangement comprising a first bellows movable in accordance with variations in air pressure in the receiving nozzle, a second bellows mechanically-coupled to the first bellows, said second bellows being closed except for means communicating with the receiving nozzle and said second bellows by its inertia being effective upon movement by the first bellows to vary the pressure in the receiving nozzle in a sense opposite to that brought about by movement of the vane in the air stream.

7. A bellows assembly for use in a pneumatic system and comprising a closed bellows having a tube communicating with the interior thereof, a rigid bracket member secured to one end of the bellows and carrying a shaft spaced from the other end of the bellows, and a second rigid bracket member secured to the other end of the bellows and carrying a shaft spaced from the said one end of the bellows, said shafts being in axial alignment.

8. A bellows assembly for use in a pneumatic system and comprising a closed bellows having a tube communicating with the interior thereof; a first U-shaped bracket having a base portion spaced from the bottom of the bellows, saide arms spanning the bellows and inwardly-directed ends secured to the top of the bellows; a second U-shaped bracket having a base portion spaced from the top of the bellows, side arms spanning the bellows and inwardly-directed ends secured to the bottom of the bellows, and axially-aligned shafts individually secured to the base portions of the U-shaped members.

9. A pneumatic follow-up system comprising a rotatable member carrying a vane, a pair of axially-aligned nozzles rotatable about the axis of said rotatable member and disposed on opposite sides of the vane, means connecting one of said nozzles to a source of air under pressure resulting in a stream of air flowing from the one nozzle to the other nozzle except as cut off by the vane, an air relay having a chamber closed by a diaphragm and connected to the said other nozzle, means actuated by movement of the diaphragm to correspondingly vary the pressure of air in an air line, a primary bellows movable by variation of the pressure in the air line, an auxiliary bellows mechanically coupled to the primary bellows and movable therewith, mechanism coupled to the auxiliary bellows for rotating the said nozzles in a direction to maintain the said vane substantially in its throttling position in the air stream, and a tube connecting the auxiliary bellows to the relay chamber, movement of the primary bellows causing the auxiliary bellows to vary the pressure of the air in the relay chamber in a direction opposite to that brought about by movement of the vane in the air stream.

10. A pneumatic follow-up system comprising a rotatable member carrying a vane, a pair of axially-aligned nozzles rotatable about the axis of said rotatable member and disposed on opposite sides of the vane, means connecting one of said nozzles to source of air under pressure resulting in a stream of air flowing from the one nozzle to the other nozzle except as cut off by the vane, means actuated by a variation in the pressure of air in said other nozzle to correspondingly vary the pressure of the air in an air line, a primary bellows movable by variation of the pressure in said air line, auxiliary bellows mechanically coupled to the primary bellows and movable therewith, mechanism coupled to the auxiliary bellows for rotating the said nozzles in a direction to maintain the said vane substantially in its throttling position in the air stream, and a feedback tube from the auxiliary bellows to modify the action of said means actuated by a variation in the pressure of air in said other nozzle.

References Cited in the file of this patent

UNITED STATES PATENTS

| | | |
|---|---|---|
| Re. 23,723 | Allwein | Oct. 13, 1953 |
| 2,102,007 | Kimball | Dec. 14, 1937 |
| 2,254,098 | Ziebolz | Aug. 26, 1941 |
| 2,332,627 | Erbguth | Oct. 26, 1943 |
| 2,380,858 | McMahon | July 31, 1945 |
| 2,441,044 | Tate | May 4, 1948 |
| 2,518,224 | Moore | Aug. 8, 1950 |
| 2,638,874 | Woodhull | May 19, 1953 |
| 2,675,819 | Eckman | Apr. 20, 1954 |

FOREIGN PATENTS

| | | |
|---|---|---|
| 458,823 | Great Britain | Dec. 28, 1936 |